(12) United States Patent
Bicker et al.

(10) Patent No.: US 8,673,406 B2
(45) Date of Patent: Mar. 18, 2014

(54) METHOD AND DEVICE FOR THE PLASMA TREATMENT OF SURFACES CONTAINING ALKALI AND ALKALINE-EARTH METALS

(75) Inventors: Matthias Bicker, Mainz (DE); Uwe Rothhaar, Birkenheide (DE); Robert Hormes, Muellheim (DE); Bernd Hanser, Muellheim (DE); Manfred Lohmeyer, Nackenheim (DE); Stefan Bauer, Alzey (DE)

(73) Assignee: Schott AG, Mainz (DE)

( * ) Notice: Subject to any disclaimer, the term of this patent is extended or adjusted under 35 U.S.C. 154(b) by 1220 days.

(21) Appl. No.: 11/680,501

(22) Filed: Feb. 28, 2007

(65) Prior Publication Data
US 2007/0232066 A1 Oct. 4, 2007

(30) Foreign Application Priority Data

Mar. 1, 2006 (DE) .................. 10 2006 009 822

(51) Int. Cl.
*C23C 14/02* (2006.01)
*C23C 14/04* (2006.01)
*C03C 15/00* (2006.01)
*C03C 17/22* (2006.01)

(52) U.S. Cl.
USPC ........... 427/534; 427/535; 427/524; 427/527; 216/67; 134/1.1

(58) Field of Classification Search
None
See application file for complete search history.

(56) References Cited

U.S. PATENT DOCUMENTS

| 3,639,198 | A | * | 2/1972 | Plumat et al. ............... 428/410 |
| 4,983,255 | A | * | 1/1991 | Gruenwald et al. ........... 134/1.1 |
| 5,246,768 | A | | 9/1993 | Rostaing et al. |
| 6,083,355 | A | * | 7/2000 | Spence ....................... 204/164 |
| 6,395,239 | B1 | * | 5/2002 | Tabata et al. ............. 422/186.07 |
| 6,489,585 | B1 | * | 12/2002 | Nakamura et al. ....... 219/121.52 |
| 6,537,626 | B1 | * | 3/2003 | Spallek et al. .............. 428/34.4 |
| 2001/0006843 | A1 | | 7/2001 | Park |
| 2002/0025646 | A1 | | 2/2002 | Kim et al. |
| 2005/0016456 | A1 | * | 1/2005 | Taguchi et al. ........... 118/723 E |
| 2005/0032626 | A1 | * | 2/2005 | Song et al. ..................... 502/53 |
| 2005/0221000 | A1 | | 10/2005 | Ikeda et al. |
| 2005/0226802 | A1 | * | 10/2005 | Goodwin et al. ............ 423/335 |
| 2006/0257299 | A1 | * | 11/2006 | Lanz ......................... 422/186.04 |
| 2007/0029500 | A1 | * | 2/2007 | Coulombe et al. ......... 250/423 F |
| 2008/0118734 | A1 | * | 5/2008 | Goodwin et al. ............ 428/221 |

FOREIGN PATENT DOCUMENTS

DE 35 18 197 A1 11/1986
(Continued)

OTHER PUBLICATIONS

Webster's Ninth New Collegiate Dictionary, Merriam-Webster Inc., publishers, Springfield, Massachusetts, USA, 1990 (no month), excerpt p. 1184.*
Derwent abstract(account #1986-319785) of DE 35 18 197 A1 (published Nov. 27, 1986),or US 4,983,255 to Gruenwald et al.(published Jan. 8, 1991).*

(Continued)

*Primary Examiner* — Marianne L Padgett
(74) *Attorney, Agent, or Firm* — Kaplan Breyer Schwarz & Ottesen, LLP

(57) ABSTRACT

The invention relates to a method for the plasma treatment of glass surfaces, the metal component, in particular the alkali and/or alkaline-earth metal component in the superficial region of the substrate being reduced by a plasma treatment of a substrate.

10 Claims, 4 Drawing Sheets

(56) References Cited

FOREIGN PATENT DOCUMENTS

| DE | 38 18 739 A1 | 12/1988 | |
|---|---|---|---|
| DE | 198 56 307 C1 | 1/2000 | |
| EP | 1 111 084 A1 | 6/2001 | |
| JP | 01-131037 * | 5/1989 | .............. C03C 17/34 |
| JP | 01157437 A | 6/1989 | |
| WO | 99/50199 | 10/1999 | |
| WO | 2006134123 A2 | 12/2006 | |

OTHER PUBLICATIONS

JPO English abstract of JP 01157437 A, published Jun. 1989, by Yamaoka Tomonori.

Marten Walther, et. al. "Packaging or Sensitive Parenteral Drugs in Glass Containers with a Quartz-like Surface", Packaging of Sensitive Parenteral Drugs, XP-000827860, in English.

Supervisor: Juergen WRBA, "European Office Action for International Application No. 07 004 206.4-2111", Dated: May 8, 2009, Publisher: European Patent Office.

* cited by examiner

METHOD AND DEVICE FOR THE PLASMA TREATMENT OF SURFACES CONTAINING ALKALI AND ALKALINE-EARTH METALS

FIELD OF THE INVENTION

The invention relates to a method for treating glass surfaces which contain metal, in particular alkali and alkaline-earth metals, by means of a plasma.

BACKGROUND OF THE INVENTION

The use of glasses containing metal, in particular the elements of the alkali and alkaline-earth metals, is impossible or only limitedly possible in many components since, for example by diffusion or exchange processes, alkali and alkaline-earth metal ions emerge from the glass and exert undesired effects.

This particularly affects medicaments which are stored in glass vessels containing alkali metal. Especially in the case of aqueous solutions, leaching of the glass surface takes place so that the medicament becomes contaminated with alkali and alkaline-earth metal ions. In the case of display glasses as well, the diffusion of alkali and alkaline-earth metal ions into applied semiconductor structures can even lead to failure of the display or at least individual pixels. This particularly affects the case in which high-temperature steps are carried out during production of the display, which significantly accelerate the diffusion of alkali and alkaline-earth metal ions. In many cases, it is therefore necessary to reduce the alkali and alkaline-earth metal concentration at least in the superficial region of a substrate.

In the case of glass, for example, this may be carried out during hot forming. For instance EP 1 138 639 discloses a method for producing glass tubes, in which the tubes are hot-blown in a gas atmosphere containing oxygen. This leads to reduction at least of sodium ions on the glass surface. A disadvantage with this method, however, is that alkali metal ions can reach the surface again by diffusion if further hot forming steps take place in the production chain.

Another possibility is to wash glass containing alkali metal with aqueous solutions, acids or sulfate solutions. It is known in practice from pharmaceutical packaging, for example, to rinse the surface of glass with an ammonium sulfate solution in order to reduce the metal ion content. Such chemical cleaning and leaching methods, however, entail the risk of contamination. A further risk is that this treatment generally attacks and damages the glass network at least in the surface region, so that the strength of the glass is reduced and the risk of the glass cracking is therefore increased.

As an alternative to the leaching of substrates, barrier layers may be applied as diffusion barriers for alkali and alkaline-earth elements. Such barrier layers are relatively expensive and cannot be applied in all cases. For example, further hot forming of the preform may lead to destruction of the barrier layer.

It has furthermore been found that according to the prior art, it is often impossible to reduce the concentration of alkali and alkaline-earth metal ions sufficiently in the superficial region.

OBJECT OF THE INVENTION

In relation to the prior art, it is an object of the invention to provide a reliable and suitable method for reducing the metal content, in particular of alkali and alkaline-earth elements, in the surface region of a substrate.

It is also an object of the invention to provide a method for reducing the alkali and alkaline-earth metal content in the surface region of glass, which damages the glass structure as little as possible.

The method according to the invention should furthermore make it possible to provide a substrate having a reduced alkali and alkaline-earth metal concentration at least in the superficial region, the substrate being subjectable to further processing steps.

When carrying out the method according to the invention, contamination of the substrate should be avoided and thermal loading of the substrate should be reduced.

SUMMARY OF THE INVENTION

The object of the invention is achieved directly by a method for the plasma treatment of surfaces, by a substrate and by a device for the plasma treatment of surfaces.

The invention provides a method for the plasma treatment of surfaces. In particular, the invention relates to the treatment of glass surfaces. The invention may nevertheless also be suitable for other substrates, in particular organic substrates.

According to the invention, a substrate with a surface to be treated is provided, the substrate containing metal. In particular, the substrate comprises one or more elements of the alkali and alkaline-earth metal groups. These may be present both in ionic form and in elementary form or as compounds in the substrate.

The Inventors have found that by providing a process gas or a process gas mixture and striking a plasma, the metal component, in particular the alkali metal component but also the alkaline-earth metal component, is reduced by means of the plasma at least in the superficial region.

The Inventors have found that elements of the alkali and/or alkaline-earth metal group are not just removed from the glass surface by simple exchange, for example with nitrogen atoms, but that a superproportional reduction can be achieved which extends far beyond exchange effects.

The plasma treatment has a high selectivity particularly in respect of the elements of the alkali metal group, in particular sodium, is inexpensive to carry out with a large system throughput and does not damage the glass surface.

In a preferred embodiment, a process gas containing hydrogen is provided. A process gas containing hydrogen in the context of the application is intended to mean all compounds which contain hydrogen, as well as gas mixtures which contain hydrogen or a hydrogen compound.

The plasma treatment is preferably carried out as a reactive process by using a compound containing hydrogen and/or containing halogen, in particular $SF_6$, $CF_4$, $CHF_3$, $NF_3$, $Cl_3$, HCl, $CCl_4$, and/or HBr.

Based on test results, it may be assumed that a plasma treatment with a process gas containing hydrogen leads to exchange of alkali and alkaline-earth metal ions by hydrogen ions at least in the superficial region of the substrate. The alkali and alkaline-earth metal ions in this case both enter the gas phase directly. In a refinement of the invention, a process gas containing nitrogen is provided. It is assumed in this case that the nitrogen activated by the plasma forms a silicon-nitrogen bond on the glass surface.

A process gas found to be particularly suitable is ammonia, which comprises both nitrogen and hydrogen and with which a plasma can be struck very well.

As an alternative or in combination, hydrogen or steam may in particular also be used as a process gas.

In order to improve the strikeability of the plasma, according to a refinement of the invention a noble gas, in particular argon or krypton, is added to the process gas.

In order to increase a uniform temperature distribution, an inert gas may be added, in particular nitrogen, as is provided in a refinement of the invention.

For heating the substrate to the process temperature or for cleaning or oxidizing the surface, provision is furthermore made to add a reactive gas, in particular oxygen.

During the plasma treatment, the substrate temperature is at least 50° C. below the glass transition temperature, in particular on the substrate surface which is exposed to the plasma.

The temperature of the substrate during the plasma treatment, in particular on the substrate surface, is preferably from 50 to 500° C., particularly preferably from 120 to 400° C. Such low temperatures substantially prevent metal ions, in particular alkali and alkaline-earth metal ions, diffusing to the surface from deeper layers of the substrate.

The method according to the invention may be carried out with lower temperatures so that glasses are thermally loaded scarcely at all and stresses in the glass are substantially avoided. It may also be used in principle for organic plastic substrates.

In a preferred embodiment of the invention, a hollow body is provided as the substrate. Process gas is introduced into the hollow body and, by the method according to the invention, the concentration of alkali and alkaline-earth metal ions on the inner surface of the hollow body is reduced by means of a plasma treatment.

It is thus possible to provide packaging, in particular bottles which, when filled with an aqueous liquid, release fewer alkali and alkaline-earth metal ions to the liquid.

In a particular embodiment of the invention, the plasma treatment is carried out at a pressure of more than 300 mbar, preferably more than 600 mbar and particularly preferably at about atmospheric pressure. With such pressure ranges, long evacuation times can be obviated and the system throughput can thus be increased.

It has been found that electromagnetic waves in particular frequency ranges are particularly suitable for striking the plasma. In particular a medium frequency in the range of from 1 to 100 kHz or a high frequency in the range of from 10 to 20 MHz, preferably 13.56 MHz, is provided in the form of a dielectric barrier discharge or a plasma jet method.

As an alternative, a microwave may be used with a frequency of more than 1 GHz, preferably a high frequency of 2.45 GHz with an atmospheric microwave plasma burner.

The plasma is preferably struck by electromagnetic radiation, in particular by electromagnetic radiation with a frequency of between 10 kHz and 300 GHz. In particular, microwaves with a frequency of between 1.5 and 5.2 GHz are suitable.

In a preferred embodiment, microwaves with a frequency of 2.45 GHz are used.

In order to reduce the release of alkali and alkaline-earth metal even further, the surface may also be provided with a barrier layer after the plasma treatment, in particular an $SiO_x$ barrier layer as is provided in a refinement of the invention. Such a barrier layer reduces the diffusion of possible alkali or alkaline-earth metal ions remaining in this surface region of the substrate or diffused later into the surface region.

Such a barrier layer is preferably deposited in a subsequent process step, for instance by a deposition method, in particular a CVD or PVD method.

If the intention is to exclude only certain metal ions, in particular sodium ions, then it is also feasible to apply a coating containing metal, in particular a coating containing titanium, silicon, or aluminium.

Plasma treatment devices suitable for the surface conditioning are in particular those also usable conventionally for the production of thin layers by a PECVD (plasma enhanced chemical vapor deposition) method. These plasma treatment devices can generate a plasma which is highly energetic, but with which the substrate temperature can be kept very low during the plasma treatment.

Besides or instead of microwaves, radio waves may also be used to strike the plasma, in particular with a frequency of between 150 kHz and 110 MHz. A preferred embodiment of the method uses radio waves with a frequency of 13.56 MHz.

In a refinement of the invention, the plasma is pulsed, in particular using pulses of electromagnetic radiation which generates the plasma.

In this way, a highly energetic plasma can be generated with only a low average power. The substrate does not therefore become hot. The ion mobility in the substrate remains low, so as to substantially prevent ions lying deep below the substrate surface from diffusing into surface regions.

The pulse duration is preferably between 0.1 and 10 ms, particularly preferably between 0.3 and 5 ms, with pulse pauses of between 2 and 200 ms, preferably between 5 and 50 ms. Within these ranges, the method can be adapted to various substrates. In the case of substrates which can be thermally loaded more strongly, for example, shorter pulse pauses are employed and the substrate is treated with a higher average energy.

In a refinement of the invention, the substrate is cleaned, in particular before the plasma treatment. Even with pre-cleaning of the substrate, alkali and alkaline-earth metal ions become washed out. The precleaning is preferably carried out with pure, for instance demineralized, water.

As an alternative, acids may also be used.

In particular, hydrochloric acid dilution is highly suitable since dilute hydrochloric acid leads to less contamination of the substrate.

Further cleaning may be carried out after the plasma treatment of the substrate.

The plasma treatment reduces at least the alkali and alkaline-earth metal component to a depth of at least 3 nm, preferably to a depth of at least 20 nm and particularly preferably to a depth of at least 30 nm, so as to achieve a reduction by a factor of 1.2, preferably 2.0 and particularly preferably 4.0 in respect of at least one element of the alkali or alkaline-earth metal group.

By the plasma treatment method according to the invention, it is even possible to reduce the alkali and alkaline-earth metal component, preferably the sodium component, significantly to depths of more than 30 nm.

A substrate temperature of 400° C., preferably 200° C. and particularly preferably 150° C. is not exceeded during the treatment.

The plasma treatment is preferably carried out over a period of from 1 second to three hours, and particularly preferably from 35 seconds to 10 minutes.

The invention also relates to the use of a method for the plasma treatment of surfaces in order to reduce the alkali and alkaline-earth metal component, at least in a superficial region of the substrate.

The invention furthermore relates to a substrate which is producible by a method for the plasma treatment of surfaces.

The substrate preferably comprises a hollow body. In particular, the method may be used for pharmaceutical packaging, in particular bottles, ampoules and syringes.

The invention is also intended for semifinished products for pharmaceutical packaging, for example tubes which are closed by a hot forming process before or after filling.

The method according to the invention is furthermore suitable for reducing the alkali and alkaline-earth metal component in display glasses. This prevents sodium ions, in particular, from diffusing into the semiconductor structures next to the display glass.

Another application field is the use of the method for incandescent lamps or metal vapor lamps. The plasma treatment reduces the metal, preferably alkali or alkaline-earth metal component, at least in the superficial region of a lamp bulb. The lifetime of the lamp can therefore be increased, since fewer metal atoms can diffuse onto the glass surface and evaporate there during operation. Evaporated metal ions may condense in other, cooler zones of the lamp and thereby damage the lamp.

The substrate used in a particular embodiment of the method is a glass substrate containing alkali or alkaline-earth metal, which comprises from 10 to 40 at-% silicon, from 20 to 70 at-% oxygen, from 0.05 to 10 at-% boron, from 0.01 to 5 at-% fluorine and from 0.05 to 10 at-% aluminum. It is to be understood that other constituents may also be contained. In the context of the invention, at-% is intended to mean the number of atoms of the respective element divided by the total number of atoms in the material.

The sodium component in a plasma-treated region is less than 5 at-% preferably less than 1 at-% and particularly preferably less than 0.3 at-% to a depth of 30 nm. In the plasma-untreated region of the substrate, on the other hand, the sodium component is between 0.1 and 30 at-%, preferably between 10 and 20 at-%.

The calcium component is also reduced significantly by the method according to the invention. The calcium component is thus less than 2 at-%, preferably less than 0.7 at-% and particularly preferably less than 0.3 at-% to a depth of 3 nm. In the plasma-untreated region of the substrate, conversely, the calcium component is between 0.05 and 30 at-%, preferably between 3 and 20 at-%.

Furthermore, the nitrogen component in a plasma-treated region of the substrate is preferably more than 1 at-%, preferably more than 2 at-%, particularly preferably more than 4 at-% to a depth of at least 3 nm. The nitrogen component in a plasma-untreated region of the substrate is less than in the plasma-treated region, however, and is less than 10 at-%, preferably less than 4 at-% and particularly preferably less than 1 at-%. It is to be assumed that the change in the nitrogen component takes place because of silicon-nitrogen bonds forming on the surface of the substrate during the plasma treatment.

A barrier coating applied in a preferred embodiment of the invention, in particular a deposited $SiO_x$ layer, has a thickness between 2 nm and 1 μm, preferably between 5 nm and 300 nm.

The invention furthermore relates to medicament packaging, in particular as bottles, syringes or ampoules, comprising a substrate according to the invention.

The invention furthermore relates to a display, in particular a TFT display, comprising a substrate according to the invention.

The invention furthermore relates to a lamp bulb, in particular for an incandescent lamp or metal vapor lamp, comprising a substrate according to the invention.

The invention furthermore relates to a device for the plasma treatment of surfaces, in particular for carrying out a method according to the invention. The plasma treatment device comprises a substrate holder, a feed for introducing process gas and an instrument for generating a plasma.

According to the invention, the plasma treatment device comprises at least one feed for introducing ammonia and a storage container for ammonia. In a preferred embodiment of the plasma treatment device, the substrate holder is designed to hold hollow bodies with an opening. In the held state, the hollow body bears essentially fluid-tightly, for instance using a seal, with its opening on the substrate holder. Through the opening of the hollow body, the hollow body is evacuated before the plasma treatment and the process gas is introduced.

BRIEF DESCRIPTION OF THE DRAWINGS

The invention will be explained in more detail below with reference to the drawings, i.e.

FIG. 1 shows an SIMS intensity-sputtering time profile of an untreated glass bottle, FIG. 2 shows an SIMS intensity-sputtering time profile of a glass bottle treated with an $NH_3$ plasma, FIG. 3 shows a plasma treatment device according to the invention, FIG. 4 shows the essential method steps when carrying out a plasma treatment method.

DETAILED DESCRIPTION

Figure 1:
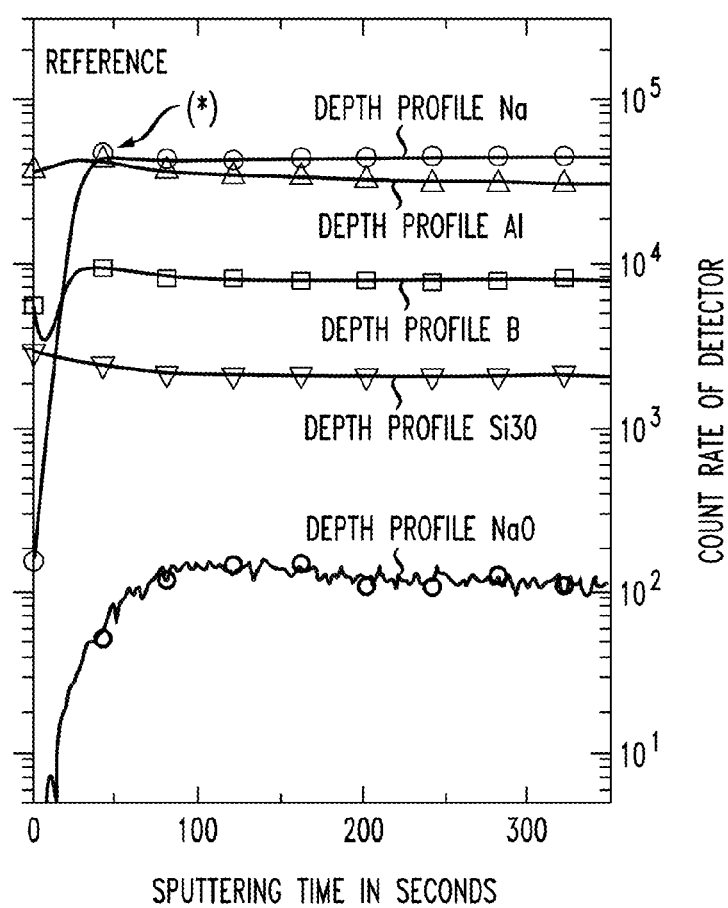
FIG. 1 to FIG. 4, with the aid of exemplary embodiments.
Figure 2:
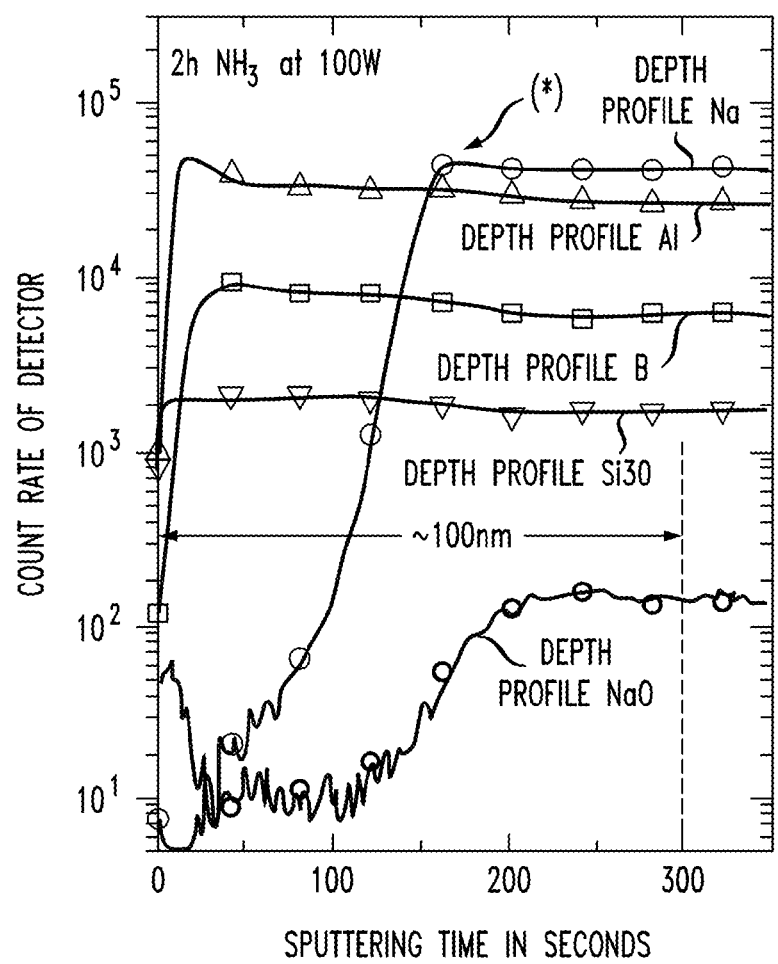

According to a first exemplary embodiment, in which reference is made to the drawings FIG. 1 and FIG. 2, a glass bottle of borosilicate glass (FIOLAX type from Schott) with a volume of 10 ml, a height of 40 mm and a diameter of 22 mm (DIN ISO 8362, standard size 6R) was washed with deionized water at a temperature of 60° and dried. The glass bottle was subsequently introduced into a plasma treatment device. The interior of the bottle was evacuated to a pressure of less than 0.5 mbar. The bottle bears essentially fluid-tightly on the coating apparatus. The pressure outside the bottle remains at atmospheric pressure.

According to a first exemplary embodiment, in which reference is made to the drawings FIG. 1 and FIG. 2, a glass bottle of borosilicate glass (FIOLAX type from Schott) with a volume of 10 ml, a height of 40 mm and a diameter of 22 mm (DIN ISO 8362, standard size 6R) was washed with deionized water at a temperature of 60° and dried. The glass bottle was subsequently introduced into a plasma treatment device. The interior of the bottle was evacuated to a pressure of less than 0.5 mbar. The bottle bears essentially fluid-tightly on the coating apparatus. The pressure outside the bottle remains at atmospheric pressure.

The plasma treatment apparatus used in this exemplary embodiment is a dual space module, in which two bottles can respectively be treated at the same time. The apparatus comprises a microwave generator for the plasma generation.

While the connection to the vacuum is maintained, a reaction gas consisting of ammonia is introduced through an inlet valve with a flow rate of 100 sccm (standard cubic centimeters per minute) and a pressure of 0.7 mbar. After a phase of stabilizing the gas flow lasting 20 sec, pulsed microwave energy with a frequency of 2.45 GHz and a total average microwave power of 100 W is input from the microwave source into the two reactor chambers. A plasma is struck inside the two bottles, while no plasma strikes outside because of the atmospheric pressure. The duration of the plasma treatment on the inside is 2 hours in this exemplary embodiment.

The maximum temperature during this plasma treatment is 170° C. At the end of the treatment, the microwave energy is stopped, the process gas is switched off and the interior of the bottles is brought to atmospheric pressure.

The bottles are subsequently filled with distilled water and autoclaved for one hour at approximately 121° C. After this treatment, a value of 0.22 μg/ml is measured for the sodium leaching. For washed but otherwise untreated reference bottles, the sodium leaching was more than a factor of 3 higher at 0.72 μg/ml.

FIG. 1 shows an SIMS (secondary ion mass spectrometry) intensity-sputtering time profile of a washed but otherwise untreated bottle. The x axis indicates the sputtering time in seconds, while the y axis gives the count rate of the detector.

Curves were recorded for the following materials:
Reference 1 shows the profile of Nao
Reference 2 shows the profile of Si-30
Reference 3 shows the profile of B
Reference 4 shows the profile of Al
Reference 5 shows the profile of Na A sputtering time of 300 seconds corresponds approximately to a depth of 100 nm.

As can be seen in FIG. 1, particularly in the case of Nao and Na, slight leaching in the surface region due to the washing process can be observed even in the washed bottle. All the curves rise steeply, however, that is to say the concentration of the ions already rises strongly at a depth of a few nanometers. Since ion leaching out of deeper regions to the superficial zone takes place during the storage of aqueous solutions, the sodium profile achieved by the washing process is not yet optimal.

FIG. 2 shows the depth profile of a plasma-treated bottle, which was otherwise treated like the bottle according to FIG. 1. As can be seen, the plasma treatment leads to significant depletion of alkali and alkaline-earth elements in the surface region, particularly of sodium. The Na and NaO profiles of the treated samples thus show much lower intensities compared with the untreated samples, particularly within the first 50 nanometers (corresponding to a sputtering time of up to 150 seconds). For the constituents of the glass matrix i.e. B, Al and Si, however, the profiles are substantially unchanged, which indicates a very good selectivity particularly with respect to sodium. In FIG. 1, the sodium profile already reaches the maximum count rate of the detector after a sputtering time of less than 50 seconds, while this value is not achieved until after approximately 150 seconds in FIG. 2.

This result is also confirmed by a measurement based on X-ray photoelectron spectroscopy (XPS analysis) of the same sample, in which the gas composition can be determined as far as a depth of approximately 3 nm. The following values are obtained (all specifications in at-%):

| Element | Untreated | Plasma-treated |
|---------|-----------|----------------|
| B       | 1.2       | 0.5            |
| C       | 9.0       | 7.9            |
| N       | 0.8       | 16.6           |
| O       | 59.8      | 45.1           |
| F       | 0.1       | 1.6            |
| Na      | 1.1       | 0.1            |
| Al      | 3.1       | 2.3            |
| Si      | 23.3      | 25.8           |
| Ca      | 0.6       | 0.1            |

The XPS analysis thus likewise shows that the plasma-treated surface is significantly depleted at least in respect of the sodium ion content, and that nitrogen is also enriched in the superficial zone. While the untreated sample has a sodium concentration of 1.1 at-% on the surface, this is only 0.1 at-% after the plasma treatment with ammonia. Being 4.5 at-%, the sodium concentration in the volume of the substrate is much higher.

A significantly reduced concentration is also obtained for calcium: 0.1 at-% compared with 0.6 at-% for the untreated sample. The surface was furthermore enriched with approximately 16 at-% nitrogen by the plasma treatment.

The method according to the invention is thus not only suitable for reducing the alkali and alkaline-earth metal components on the surface, but may also be used to harden glass surfaces by incorporating nitrogen atoms.

Compared with this, the silicon concentration is scarcely changed by the ammonia plasma treatment. The decrease for the elements aluminum and boron turns out to be less than that for alkali and alkaline-earth elements.

Concerning a second exemplary embodiment, in which primarily the process time is optimized, in respect of the structure reference is made to the first exemplary embodiment described above.

Instead of a microwave power of 100 W, however, according to the second exemplary embodiment a plasma is struck in the two reactor chambers with a microwave power of approximately 1300 W using a pulsed microwave source. The duration of the plasma treatment is merely 30 seconds. During the treatment, the temperature of the borosilicate bottle rises to 400° C. owing to the high average power. The Inventors have discovered that even this very short process leads to pronounced sodium depletion in the superficial glass zone.

Figure 3:
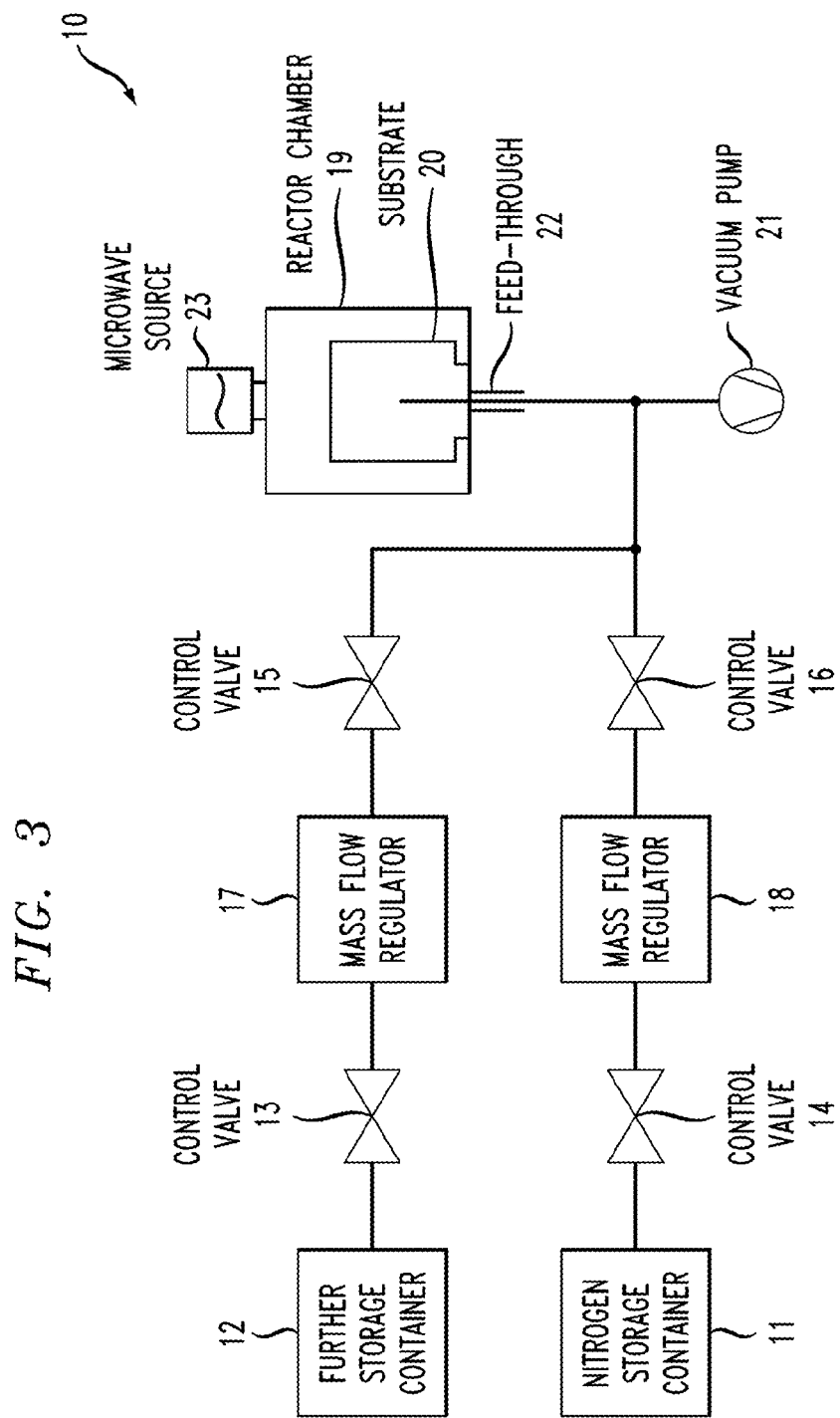

Reference will now be made to FIG. 3, which schematically shows a plasma treatment device 10 according to the invention. The plasma treatment device 10 comprises a storage container for nitrogen 11 and a further storage container 12 for adding another process gas, for example argon, nitrogen or oxygen. The two storage containers 11, 12 are connected to the reactor chamber 19 through valves 13, 14, 15, 16, which are respectively coupled to a mass flow regulator 17, 18. Using the mass flow regulators 17, 18, it is thus possible to adjust a defined process gas mixture with a defined volume or mass flow rate. A substrate 20 in the form of a bottle is arranged essentially fluid-tightly on a feed-through 22 in the reactor chamber 19. The substrate 20 is evacuated by means of a vacuum pump 21. The process gas is then introduced into the substrate 20. Microwaves are input into the reactor chamber 19 using a microwave source 23. Owing to the atmospheric pressure prevailing outside the substrate, a plasma is struck only inside the substrate.

Figure 4:
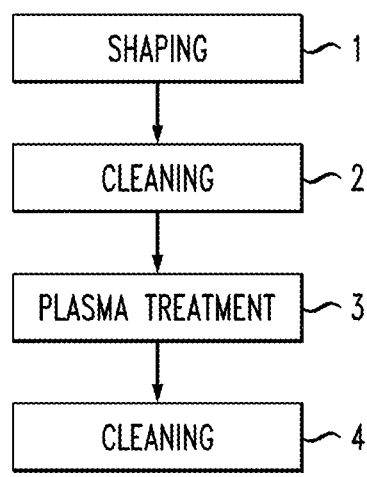

FIG. 4 schematically shows the essential steps of an embodiment of a method according to the invention. As a first step, a glass substrate is given its shape. It may also be a semifinished product, which undergoes yet further shaping steps after having carried out the method, in particular hot forming steps. The next step provided is to clean the substrate, preferably in pure water. This already dissolves alkali and alkaline-earth metal ions out in the superficial region. The plasma treatment of the substrate is then carried out by means of a method according to the invention. The substrate may subsequently be coated with a barrier layer, preferably in the same device.

Optionally, the substrate may again be cleaned in a fourth step. This method step, however, is not categorically necessary. The cleaning is once more carried out using pure water. Alkali and alkaline-earth metal ions which may still be adhering on the surface are thereby essentially removed.

It is to be understood that the invention is not restricted to the combination of features in the exemplary embodiments mentioned here. Rather, depending on the specific requirement, the person skilled in the art may combine the features described according to the invention insofar as this is expedient.

LIST OF REFERENCE NUMBERS 1 depth profile NaO
2 depth profile Si$_3$O
3 depth profile B
4 depth profile Al
5 depth profile Na
10 plasma treatment device
11 nitrogen storage container
12 further storage container
13-16 control valves
17-18 mass flow regulator
19 reactor chamber
20 substrate
21 vacuum pump
22 feed-through
23 microwave source

What is claimed is:

1. A method for plasma treatment of glass surfaces, the method comprising the steps of:
providing a glass substrate having a surface to be treated, the substrate at least locally having at least one alkali metal or at least one alkaline-earth metal;
providing a process gas containing hydrogen or process gas mixture containing hydrogen in such a way that the surface to be treated comes in contact with the process gas;
striking a hydrogen containing plasma; and
reducing a content of the at least one alkali metal or alkaline-earth metal by using the hydrogen containing plasma,
wherein a dielectric barrier discharge is used for the plasma treatment,
wherein the content of the at least one alkali or alkaline earth metal is reduced in a superficial region of the glass substrate in that the content of the at least one alkali metal or alkaline-earth metal in terms of atomic % is reduced by a factor of at least 1.2 to a depth of at least 3 nm,
wherein the temperature of the substrate during the plasma treatment does not exceed 400° C., and
wherein the plasma is pulsed having pulses with a duration of between 0.1 and 10 ms and pauses between the pulses of between 2 and 200 ms.

2. The method for the plasma treatment of glass surfaces as claimed in claim 1, wherein the glass substrate has a substrate temperature during the plasma treatment that is at least 50° C. below the glass transition temperature of the glass substrate.

3. The method for the plasma treatment of glass surfaces as claimed in claim 1, wherein a hollow body is provided as the substrate.

4. The method for the plasma treatment of glass surfaces as claimed in claim 1, wherein the plasma treatment is carried out at a pressure of more than 300 mbar.

5. The method for the plasma treatment of glass surfaces as claimed in claim 1, wherein a high frequency in the range of from 10 to 20 MHz is used for the plasma treatment of glass surfaces.

6. The method for the plasma treatment of glass surfaces as claimed in claim 1, wherein the surface is coated at least locally after the plasma treatment.

7. The method for the plasma treatment of glass surfaces as claimed in claim 1, wherein the surface is coated at least locally with a metal compound after the plasma treatment.

8. The method for the plasma treatment of glass surfaces as claimed in claim 1, wherein the content of the at least one alkali metal or alkaline earth metal in terms of atomic % is reduced by a factor of 4 to a depth of at least 30 nm.

9. The method for the plasma treatment of glass surfaces as claimed in claim 1, wherein the step of striking the plasma is carried out over a period of from 1 second to 3 hours.

10. A method for reducing a content of at least one alkali metal component or at least one alkaline-earth metal component that is present in a region of a glass substrate comprising at least one alkali or alkaline-earth metal, the method comprising the steps of:
providing a process gas containing hydrogen or process gas mixture containing hydrogen in such a way that the region of the metal component to be treated comes in contact with the process gas;
striking a hydrogen containing plasma; and
reducing the content by using the hydrogen containing plasma,
wherein a dielectric barrier discharge is used for the plasma treatment,
wherein the content of the at least one alkali or alkaline-earth metal is reduced in a superficial region of the glass substrate in that the content of the at least one alkali metal or alkaline-earth metal in terms of atomic % is reduced by a factor of at least 1.2 to a depth of at least 3 nm,
wherein the temperature of the substrate during the plasma treatment does not exceed 400° C., and
wherein the plasma is pulsed having pulses with a duration of between 0.1 and 10 ms and pauses between the pulses of between 2 and 200 ms.

* * * * *